Nov. 17, 1936.    J. A. HOPKINS    2,060,869
DEMONSTRATION DEVICE
Filed June 1, 1936
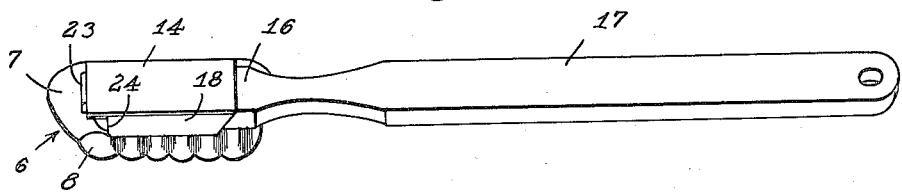
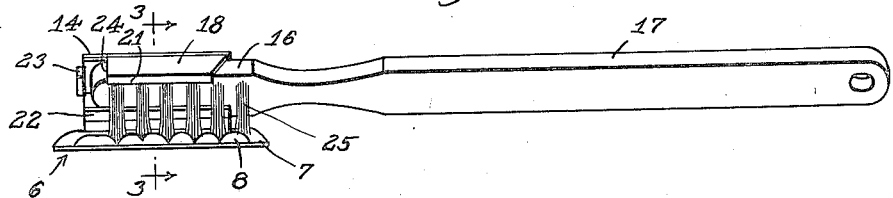
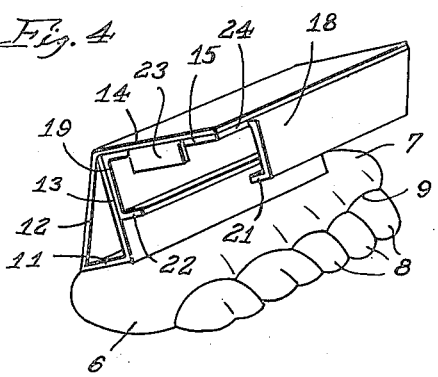
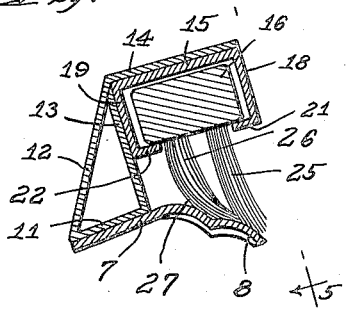
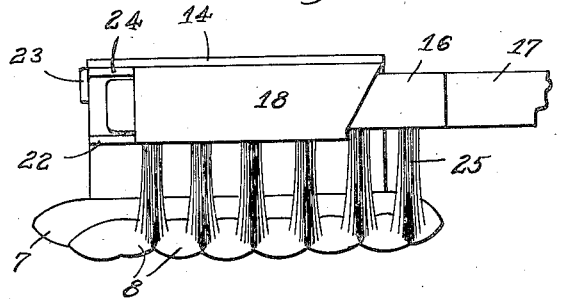
Inventor:
Joseph A. Hopkins
By
Wilson, Dowell, McCanna & Wintercorn
Attys.

Patented Nov. 17, 1936

2,060,869

UNITED STATES PATENT OFFICE 2,060,869

DEMONSTRATION DEVICE

Joseph A. Hopkins, Rockford, Ill.

Application June 1, 1936, Serial No. 82,686

4 Claims. (Cl. 35—49)

This invention relates to the science of dentistry and has special reference to a device for demonstrating and thereby teaching a technique for brushing teeth.

It is well known that many disorders of the mouth and particularly the decay of teeth may to a considerable extent be prevented by keeping the teeth clean. A number of industries have grown up based on this premise, among them being the toothbrush manufacturers, dentifrice manufacturers and the like. These industries, together with the dental profession and health departments, have conducted educational work with the view to improving the oral hygiene of the public. However, in spite of this, a certain number of mouth disorders have persisted which have been attributed to various factors, among which is the soft types of foods common at the present day which are deemed to give the gums insufficient massage and stimulation. Prominent among these disorders is that known as pyorrhea which has persisted in spite of careful brushing and care of the teeth according to past standards.

It has recently been demonstrated, however, that through the use of a special technique developed by W. J. Charters, D. D. S. the development of pyorrhea may be prevented and in many cases the infection may be eliminated. This technique is designed to give stimulation to the gums in protected locations, such, for example, as between the teeth. The technique is, however, somewhat difficult to master, and it is difficult to impart to the user a clear conception of the mechanical operations to be performed and the manner of their performance. Heretofore this technique has been taught by the dentist by actual brushing of the patient's teeth in such a manner that the patient may view the operation in a mirror so as to obtain a visual picture of the operation. This, however, has taken considerable time on the part of the dentist, since it is commonly necessary to give the patient three or four lessons at intervals of several days. Furthermore, this scheme is deficient in that normally the public does not learn the method until after trouble has developed. In other words, it entirely overlooks preventative treatment.

A primary object of the invention is the provision of a device for the purpose of demonstrating the technique of proper tooth brushing.

Another object of the invention is the provision of a device for holding a toothbrush and guiding the movement thereof so as to demonstrate the proper position of the brush with respect to the teeth and gums, and demonstrate the proper movement of the brush during the operation.

Other objects of the invention will appear from the following description and the accompanying drawing, in which—

Figures 1 and 2 are side views of the demonstration device with a toothbrush positioned therein;

Fig. 3 is a section on the line 3—3 of Fig. 2, twice enlarged;

Fig. 4 is a perspective view of the demonstration device, twice enlarged, and

Fig. 5 is a fragmentary face view, twice enlarged, showing the position of the bristles against the teeth.

The device consists of a denture portion designated generally by the numeral 6 which may be made of a wide variety of materials, such as rubber, celluloid, synthetic resins, metal or porcelain. In the present instance I have shown this portion as formed of sheet metal. This portion of the device is intended to represent a section of a denture wherein the numeral 7 indicates the gum part, and the numeral 8 designates the teeth. Preferably the gum portion and the teeth will be suitably colored so that the junction therebetween as indicated at 9 will be plainly visible and apparent. A bracket is attached to the portion 6 adjacent the edge opposed to the teeth 8, and in this instance, consists of a base 11 having legs 12 and 13 and a plate 14 overhanging the portion 6. A brush holder is attached to the lower surface of the plate 14, and consists of a top member 15 of substantially the width of the back 16 of a brush handle, designated generally by the numeral 17, side pieces 18 and 19 of a width substantially equal to the thickness of the brush handle, and inwardly projecting ledges 21 and 22 adapted to project inwardly a short distance on the bristle side of the brush handle as best shown in Fig. 3. This brush holder thus serves to position the brush with respect to the denture portion 6. A downwardly projecting lip 23 is positioned on the forward end of the top member 15 to serve as an abutment for the brush handle so as to limit its forward movement, and the side wall 18 is cut away as shown at 24 to serve as a guide for the rearward movement of the brush. Thus in the brushing stroke, the brush handle is moved from a position abutting the lip 23 to a position in line with the forward edge of the wall 18. The brush holder and bracket are so positioned that the two rows of bristles 25 and 26 will project toward the denture portion at an angle in the region of 45° to 60° depending upon the shape of the denture portion, as will be apparent from the following description of the results to be obtained, and the holder is spaced from the teeth a distance such that the ends of the bristles will abut against the teeth portion, and so that the inner row of bristles will be bent as shown at 27 so that the sides of the bristles, adjacent the ends thereof, will lie against the gum portion of the denture. Through this arrangement the ends of the bristles will be pressed against the teeth with considerable force so that the slight reciprocating movement occasioned by movement of the brush handle between the limits described will cause the ends of the bristles to be worked into the spaces between the teeth. At the same time the sides of the inner row of bristles 26 will be rubbed backward and forward over the gum portion of the denture. This is the movement desired to be taught.

It will be seen that this device offers means for visually instructing the user as to the proper angularity of the brush against the teeth and gums and the length of the stroke required to produce the desired results. The device also serves to demonstrate what these results are; that is, the user can see the manner in which this position and movement causes the tufts of bristle to be worked in between the teeth adjacent the gums and be wedged in against the gums so as to provide massage and stimulation to the gums in the limited area between the teeth which receive no stimulation by the usual hit and miss methods of brushing the teeth. Thus the device not only demonstrates the techinque, but shows the user why the technique produces the desired results, and consequently permits him to use the technique with intelligence.

It will further be seen that through the use of this device the general public may be acquainted with the proper brushing technique before pyorrhea actually develops or before they have occasion to consult a dentist so that the device may be used in the public health service to promote the proper brushing of the teeth as a preventative measure. Furthermore, by the use of this device the dentist, when occasion arises, is relieved of the necessity of teaching the technique to the patient and may simply refer the patient to a device of this character and give a few simple instructions, thereby saving considerable time on the part of the dentist and some expense to the patient.

I have herein shown one form of the device, but it will be apparent that any number of other specific constructions might be employed following the teachings of this disclosure, and I do not wish to be limited except as required by the prior art.

I claim:

1. The combination in a demonstration device of an artificial denture, and means attached thereto for holding a toothbrush in a predetermined angular relationship therewith and for guiding said brush through reciprocating movements to demonstrate a brushing technique.

2. The combination in a demonstration device of an artificial denture, means attached thereto for holding a toothbrush in a predetermined angular relationship therewith and for guiding said brush through reciprocating movements, and means for determining the amplitude of said reciprocation to demonstrate a brushing technique.

3. The combination in a demonstration device of an artificial denture having a representation of a portion of a human gum and a plurality of teeth carried therein, and a brush holder attached to said denture in overhanging spaced relation for holding a toothbrush in a predetermined angular relationship with said denture and for guiding said brush through reciprocating movements to demonstrate a brushing technique.

4. The combination in a demonstration device of an artificial denture having a representation of a portion of a human gum and a plurality of teeth carried therein, and a brush holder attached to said denture in overhanging relationship thereto, spaced from said denture to support a brush with the ends of the bristles contacting said teeth, the bristles along one side of the brush being bent so that the sides of the bristles bear against the junction between the teeth and gums, said holder having means for guiding the brush through reciprocating movements of predetermined amplitude whereby the ends of the bristles are wedged into the spaces between the teeth whereby to demonstrate a brushing technique.

JOSEPH A. HOPKINS.